United States Patent [19]

Larson et al.

[11] Patent Number: 5,414,041
[45] Date of Patent: May 9, 1995

[54] WATERBORNE COATING COMPOSITION

[75] Inventors: Gary R. Larson, Hatfield; Caren A. Puschak, Norristown; Linda S. Smith, Oreland; Kurt A. Wood, Abington, all of Pa.

[73] Assignee: Rohm and Haas Company, Philadelphia, Pa.

[21] Appl. No.: 224,923

[22] Filed: Apr. 8, 1994

[51] Int. Cl.$^6$ .............................................. C08L 75/04
[52] U.S. Cl. ................................... 524/589; 524/839; 525/123; 525/457
[58] Field of Search .............. 524/196, 197, 589, 839; 525/123, 457, 124

[56] References Cited

U.S. PATENT DOCUMENTS

| | | | |
|---|---|---|---|
| 3,554,987 | 1/1971 | Smith | 526/240 |
| 3,658,878 | 4/1972 | Smith | 558/442 |
| 4,247,673 | 1/1981 | Pontecello et al. | 526/263 |
| 4,396,738 | 8/1983 | Powell et al. | 524/813 |
| 4,663,377 | 5/1987 | Hombach et al. | 524/196 |
| 4,757,113 | 7/1988 | Paar | 525/124 |
| 4,960,924 | 10/1990 | Bors et al. | 526/216 |
| 5,021,511 | 6/1991 | Larson et al. | 525/295 |
| 5,075,370 | 12/1991 | Kubitza et al. | 524/591 |
| 5,185,200 | 2/1993 | Tirpak et al. | 524/591 |
| 5,194,487 | 3/1993 | Jacobs | 524/591 |
| 5,200,489 | 4/1993 | Jacobs et al. | 524/591 |
| 5,252,696 | 10/1993 | Laas et al. | 528/49 |

FOREIGN PATENT DOCUMENTS

| | | |
|---|---|---|
| 3219393 | 12/1993 | Australia . |
| 486881 | 11/1991 | European Pat. Off. . |
| 516277 | 12/1992 | European Pat. Off. . |
| 537568 | 4/1993 | European Pat. Off. . |
| 2643642 | 3/1978 | Germany . |

OTHER PUBLICATIONS

Degussa, Technical Information, "Degalex" VP-BF 250, pp. 1–15 (translated).

"Comparison of Methods for the Preparation of Acetoacetylated Coating Resins", Weitzman, J. S.; Del, Nottingham, W,; Del Rector, F. J.–Coating Technology, vol. 62, 1990, 101.

*Primary Examiner*—Peter A. Szekely
*Attorney, Agent, or Firm*—Ronald D. Bakule

[57] ABSTRACT

A waterborne coating composition containing an aqueous dispersion of a polymer, the polymer being substantially free from hydroxyl, primary amino, and secondary amino groups and the polymer bearing at least two active methylene groups, and an aqueous dispersion of a polyisocyanate bearing at least two isocyanate groups is provided. Also provided is a method of improving the chemical resistance of a coating and a substrate coated with the waterborne coating composition.

7 Claims, No Drawings

5,414,041

WATERBORNE COATING COMPOSITION

FIELD OF THE INVENTION

This invention relates to a waterborne coating composition containing an aqueous dispersion of a polymer, the polymer being substantially free from hydroxyl, primary amino, and secondary amino groups and the polymer bearing at least two active methylene groups; and an aqueous dispersion of a polyisocyanate bearing at least two isocyanate groups.

BACKGROUND OF THE INVENTION

Waterborne polymeric compositions such as clear or pigmented coatings are frequently required to supplant solvent-containing compositions due to effective and pending concern and legislation regarding the emission of volatile organic compounds into the atmosphere. Solvent-borne polyurethane coatings formed from the reaction of a multi-functional isocyanate with multi-functional oligomers and polymers bearing active hydrogen functionality such as, for example, acrylic polyols, are widely used for their excellent performance properties. Polyurethane performance properties including excellent chemical resistance can be attained under ambient curing conditions, although isocyanate-containing compositions most frequently must be used as two-pack compositions, i.e., mixed shortly before use, due to the inherent reactivity of the isocyanate and active hydrogen groups. The high performance of polyurethanes in an aqueous composition is highly desirable. Such urethane compositions formed from an aqueous polyisocyanate and an aqueous polyol dispersion, for example, are known; however, residual hydroxy or amino groups remaining after the reaction with the polyisocyanate may detract from the stain and chemical resistance of the cured composition. Compositions containing aqueous dispersions of polyisocyanates which provide superior properties are needed by the coatings industry.

DESCRIPTION OF THE PRIOR ART

U.S. Pat. No. 5,075,370 discloses an aqueous two-component coating composition which contains an aqueous solution and/or dispersion of a polymer containing hydroxyl groups and an emulsified polyisocyanate component.

U.S. Pat. No. 5,200,489 discloses a composition which contains a water-dispersible polyisocyanate composition having an average NCO functionality of 2 to 6 and an aqueous resin containing isocyanate-reactive groups.

None of the references discloses a waterborne coating composition containing an aqueous dispersion of a polymer, the polymer being substantially free from hydroxyl, primary amino, and secondary amino groups and the polymer bearing at least two active methylene groups; and an aqueous dispersion of a polyisocyanate bearing at least two isocyanate groups.

STATEMENTS OF INVENTION

According to a first aspect of the present invention there is provided a waterborne coating composition containing an aqueous dispersion of a polymer, the polymer being substantially free from hydroxyl, primary amino, and secondary amino groups and the polymer bearing at least two active methylene groups; and an aqueous dispersion of a polyisocyanate bearing at least two isocyanate groups.

According to a second aspect of the present invention there is provided a method of improving the chemical resistance of a coating by forming a waterborne coating composition by admixing an aqueous dispersion of a polymer, the polymer being substantially free from hydroxyl, primary amino, and secondary amino groups and the polymer bearing at least two active methylene groups; and an aqueous dispersion of a polyisocyanate bearing at least two isocyanate groups; applying the coating composition to a substrate; and curing the coating composition.

According to a third aspect of the present invention there is provided a substrate bearing a cured waterborne coating composition containing an aqueous dispersion of a polymer, the polymer being substantially free from hydroxyl, primary amino, and secondary amino groups and the polymer bearing at least two active methylene groups; and an aqueous dispersion of a polyisocyanate bearing at least two isocyanate groups.

DETAILED DESCRIPTION OF THE INVENTION

This invention is directed to a waterborne coating composition containing an aqueous dispersion of a polymer, the polymer being substantially free from hydroxyl, primary amino, and secondary amino groups and the polymer bearing at least two active methylene groups; and an aqueous dispersion of a polyisocyanate bearing at least two isocyanate groups. A "waterborne coating composition" herein is defined as a composition in a medium which is predominantly composed of water. The medium may be water or a mixture of water and at least one water-miscible solvent such as, for example, ethylene glycol butyl ether and propylene glycol propyl ether which does not react with isocyanate groups to a substantial degree during the pot-life of the coating. The pot-life of the coating is the period of time after forming the coating composition during which the coating remains useable, that is, during which no substantial viscosity increase occurs and during which no substantial attrition in the coating properties of the applied cured coating results.

The aqueous dispersion of a polymer substantially free from hydroxyl, primary amino, and secondary amino groups bearing at least two active methylene groups in the waterborne polymeric composition may be prepared by the addition polymerization of at least one ethylenically unsaturated monomer such as, for example, acrylic ester monomers including methyl acrylate, ethyl acrylate, butyl acrylate, 2-ethylhexyl acrylate, decyl acrylate, methyl methacrylate, butyl methacrylate, and lauryl methacrylate; acrylamide or substituted acrylamides; styrene or substituted styrenes; butadiene; vinyl acetate or other vinyl esters; vinyl monomers such as vinyl chloride, vinylidene chloride, N-vinyl pyrrolidone; acrylonitrile or methacrylonitrile. By "active methylene groups" herein is meant the esters and amides of acetoacetic acid, malonic acid, and cyanoacetic acid. Preferred are the esters of acetoacetic acid. When monomer(s) which do not bear active methylene groups are used exclusively in the formation of the polymer or when additional acetoacetate groups are desired, acetoacetate groups may be introduced by the use of acetoacetate-functional chain transfer agents as disclosed in U.S. Pat. No.4,960,924, hereby incorporated herein by reference, or by post-reaction of a copolymerized monomer. Cyanoacetates and cyanoacetamides may be prepared by methods known in the art as disclosed, for example, in U.S. Pat. Nos. 3,554,987: 3,658,878; and 5,021,511, hereby incorporated herein by reference. In general, any polymerizable hydroxy- or amino-functional monomer can be converted to the corresponding acetoacetate or acetoacetamide, before or after polymerization, by reaction with diketene or other suitable acetoacetylating agent (See e.g. Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). Preferred is the copolymerization of from about 5% to about 25%, by weight, based on the total monomer weight, ethylenically unsaturated monomer bearing acetoacetate functionality such as, for example, vinyl acetoacetate, acetoacetoxyethyl acrylate, acetoacetoxyethyl methacrylate (AAEM), acetoacetoxypropyl methacrylate (AAPM), allyl acetoacetate, acetoacetoxybutyl methacrylate, 2,3-di(acetoacetoxy) propyl methacrylate. Especially preferred is the aqueous dispersion of a polymer bearing at least two acetoacetate groups containing from about 10% to about 20%, by weight, based on the total monomer weight, acetoacetoxyethyl methacrylate.

Low levels of ionic monomers such as, for example, from about 0.1% to about 5%, by weight, based on the total monomer weight, (meth)acrylic acid, itaconic acid, crotonic acid, fumaric acid, maleic acid, monomethyl itaconate, monomethyl fumarate, monobutyl fumarate, maleic anhydride, dimethylaminoethyl (meth)acrylate, 2-acrylamido-2-methyl-1-propanesulfonic acid, sodium vinyl sulfonate, and phosphoethyl methacrylate may also be incorporated in the polymer bearing at least two active methylene groups. Low levels of multi-ethylenically unsaturated monomers such as, for example, from about 0.01% to about 10%, by weight, based on the total monomer weight, ethyleneglycol dimethacrylate, divinyl benzene, allyl methacrylate, 1,4-butylene glycol dimethacrylate, 1,6-hexanediol diacrylate, and diallylphthalate, may also be incorporated in the polymer.

"Substantially free from hydroxyl, primary amino, and secondary amino groups" as used herein means that monomers bearing such groups are not incorporated into the polymer; but low levels of adventitious hydroxyl, primary amino, or secondary amino groups may be present as impurities in the monomer or initiator used or may be formed during the polymerization or storage of the polymer. In any event, less than about 0.2%, by weight based on polymer weight, of hydroxyl, primary amino, and/or secondary amino groups are present in the polymer.

The glass transition temperature (Tg) of the polymer substantially free from hydroxyl, primary amino, and secondary amino groups and bearing at least two active methylene groups is preferred to be from about $-30°$ C. to about $+45°$ C., as measured by differential scanning calorimetry (DSC). The emulsion polymer samples were dried, preheated to 120° C., rapidly cooled to $-100°$ C., and then heated to 150° C. at a rate of 20° C./minute while data was being collected. The Tg was measured at the midpoint using the half-height method. More preferred is a Tg from about $-10°$ C. to about $+45°$ C.

The emulsion polymerization techniques preferred to prepare the aqueous dispersion of a polymer substantially free from hydroxyl, primary amino, and secondary amino groups and bearing at least two active methylene groups are well-known in the art. Conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels. Chain transfer agents such as, for example, mercaptans may be used during the polymerization reaction in order to moderate the molecular weight of the polymer.

The particle size of the emulsion-polymerized polymer substantially free from hydroxyl, primary amino, and secondary amino groups and bearing at least two acetoacetate groups is from about 50 nanometers to about 500 nanometers in diameter. The solids content of the aqueous dispersion of a polymer bearing at least two active methylene groups may be from about 20% to about 70% by weight.

The particles of the emulsion-polymerized polymer substantially free from hydroxyl, primary amino, and secondary amino groups and bearing at least two active methylene groups may contain two or more polymeric phases such as, for example, an inner phase and an outer phase, wherein the outer phase is the predominant phase in contact with the aqueous medium in which the particle is dispersed. Such particles are commonly made by multi-stage emulsion polymerization wherein the individual stages differ in composition. Some particles which contain two or more polymeric phases are core/shell particles, core/shell particles with shell phases incompletely encapsulating the core, core/shell particles with a multiplicity of cores, interpenetrating network particles, and the like. When multi-stage emulsion polymers bearing at least two acetoacetate groups are used, the Tg of the outer phase or shell polymer is preferred to be from about $-10°$ C. to about $+45°$ C.; the Tg of the inner phase or core polymer is preferred to be from about 25° C. to about 120° C.; the Tg of the inner phase or core polymer is more preferred to be from about 45° C. to about 90° C.; the ratio of the weight of the inner phase or core polymer to the weight of the outer phase or shell polymer is preferred to be from about 20/80 to about 80/20; the weight average molecular weight, as measured by gel permeation chromatography, of the outer phase or shell polymer is preferred to be from about 20,000 to about 10,000,000; and the acetoacetate groups are preferred to be in the outer phase or shell polymer composition.

In one embodiment of this invention acetoacetate-functional polymeric binder is treated with about a stoichiometric amount of ammonia or primary amine to form an enamine. Vinyl polymers containing pendant acetoacetate are prone to hydrolysis in water particularly on heat aging. However, this problem may be eliminated by treating the aqueous acetoacetate polymer, after preparation and neutralization, with one molar equivalent of ammonia or a primary amine such as ethanolamine, methyl amine, isopropyl amine, butyl amine, or diglycol amine.

The waterborne coating composition contains, in addition to an aqueous dispersion of a polymer substantially free from hydroxyl, primary amino, and secondary amino groups and bearing at least two active methylene groups; and an aqueous dispersion of a polyisocyanate bearing at least two isocyanate groups. The polyisocyanate may contain aliphatically, cycloaliphatically, araliphatically and/or aromatically bound isocyanate groups. Suitable water-dispersible isocyanates and methods of making aqueous dispersion of isocyanates therefrom are described in U.S. Pat. Nos. 4,663,337; 5,075,370; 5,185,200; 5,200,489; and 5,252,696; and European Patent Applications EP 486,881 and EP 516,277; hereby incorporated herein by reference. Preferred is an aqueous dispersion of a polyisocyanate bearing two to four reactive isocyanate groups.

The waterborne coating composition is formed from an aqueous dispersion of a polymer substantially free from hydroxyl, primary amino, and secondary amino groups and bearing at least two active methylene groups; and an aqueous dispersion of a polyisocyanate bearing at least two isocyanate groups by admixing the components using conventional methods such as mechanical agitation. The water-dispersible polyisocyanate may be previously dispersed in a non-reactive or in an aqueous medium or it may be dispersed in the presence of the aqueous polymer dispersion.

The ratio of equivalents of isocyanate groups to equivalents of active methylene groups in the waterborne composition may range from about 0.1 to about 5.0. Preferred is a ratio of equivalents of isocyanate groups to equivalents of active methylene groups from about 0.5 to 2.0.

The waterborne coating composition may contain, in addition to the aqueous dispersion of a polymer bearing at least two active methylene groups and an aqueous dispersion of a polyisocyanate, conventional components such as, for example, emulsifiers, pigments, fillers, coalescing agents, anti-migration aids, aqueous solutions or dispersions of non-functional polymer (by "non-functional polymer" herein is meant polymer free from primary amino, secondary amino, hydroxyl, isocyanate, or active methylene groups), curing agents, thickeners, humectants, wetting agents, biocides, plasticizers, antifoaming agents, colorants, waxes, and antioxidants. It is preferred that all such conventional components do not substantially react with active methylene or isocyanate groups within the potlife of the waterborne coating composition.

The substrates to which the waterborne coating composition of this invention may be applied include wood, plastic, leather, paper, woven and nonwoven fabrics, metal, plaster, cementitious and asphaltic substrates, previously primed or coated substrates, and the like. The cured waterborne coating composition may fulfill a decorative or protective function, or both, or may act as a primer or as an adhesive when disposed between two coatings or between two such substates. Preferred substrates are wood, metal, and plastics. The coating composition of this invention may be applied to a substrate by methods well known in the art of applying coatings such as air-assisted spray, airless spray, plural component spray guns, brush, roller, squeege, roll coater, curtain coater, and the like.

After the waterborne coating composition is applied to a substrate the coating composition cures, that is, reaction between the active methylene groups and the isocyanate groups is believed to occur. Curing to yield useful coatings properties may take place at a convenient rate at ambient temperatures such as, for example, about 0° C. to about 35° C. However, it is sometimes desirable to accelerate the rate of property development by heating the applied waterborne composition to a temperature from about 35° C. to about 200° C. Preferred is a curing temperature from about 25° C. to about 120° C. for coatings applied to heat-stable substrates and from about 25° C. to about 50° C., for substrates sensitive to higher temperatures.

The following examples are intended to illustrate the waterborne coating composition containing an aqueous dispersion of a polymer bearing at least two active methylene groups and an aqueous dispersion of a polyisocyanate bearing at least two isocyanate groups. They are not intended to limit the invention as other applications of the invention will be obvious to those of ordinary skill in the art.

EXAMPLE 1

Preparation of Aqueous Dispersion of Polymer

Preparation of Sample 1 and Comparative sample A. To a 5 liter stirred reactor 1383.0 g. deionized water (DI water) and 48.2 g. of an aqueous solution of sodium dodecylbenzenesulfonate (23% active ingredient) which had been heated to 85° C. was added 43.4 g. of Monomer Emulsion which was then rinsed into the reator with 15 g. of DI water. A solution of 2.08 g. of ammonium persulfate in 15.0 g. DI water and a solution of 2.08 g. sodium carbonate in 45 g. DI water was then added. Ten minutes after the first addition, the temperature was 85° C. and the uniform addition of the remainder of ME and a solution of 2.08 g. ammonium persulfate in 150.0 g. DI water were begun. The temperature remainded at 85° C. over the 180 minute period during which ME and catalyst were added. A catalyst/activator pair was added after the ME and catalyst feeds were complete. The final reaction mixture was neutralized to pH range of 7.5 with 29% aqueous ammonia. Comparative Sample A had a Brookfield viscosity of 22 cps at a weight % solids contents of approximately 38.3% and a particle size of 81 nanometers. Sample 1 had a Brookfield viscosity of 9 cps at a weight % solids contents of approximately 37.7% and a particle size of 80 nanometers.

TABLE 1.1

| Monomer Emulsion for Comparative Sample A. | |
|---|---|
| DI water | 425.60 |
| Anionic Surfactant (23% active) | 87.36 |
| Butyl Acrylate | 806.48 |
| Methyl Methacrylate | 551.51 |
| Methacrylic acid | 27.71 |

TABLE 1.2

| Monomer Emulsion for Sample 1. | |
|---|---|
| DI water | 425.60 |
| Anionic Surfactant (23% active) | 87.36 |
| Butyl Acrylate | 708.08 |
| Methyl Methacrylate | 511.32 |
| Acetoacetoxy ethyl Methacrylate | 138.60 |
| Methacrylic acid | 27.71 |

EXAMPLE 2

Preparation of Aqueous Dispersion of Polymer

Preparation of Samples 2–3 and Comparative Samples B–C. To a 5 liter stirred reactor 1383.0 g. deionized water (DI water) and 48.2 g. of an aqueous solution of sodium dodecylbenzenesulfonate (23% active ingredient) which had been heated to 85° C. was added 43.4 g. of Monomer Emulsion #1 (ME #1) which was then rinsed into the reactor with 15 g. of DI water. A solution of 2.08 g. of ammonium persulfate in 15.0 g. DI water and a solution of 2.08 g. sodium carbonate in 45 g. DI was was then added. Ten minutes after the first addition, the temperature was 85° C. and the addition of the remainder of ME #1 and a solution of 1.04 g. ammonium persulfate in 75.0 g. DI water was begun. The temperature remained at 85° C. over the 90 minute period during which ME #1 and the cofeed catalyst #1 was added. Thirty minutes later, the temperature was 85° C. and the addition of Monomer Emulsion #2 (ME #2) and catalyst #2 was begun. The temperature was 85° C. during the 90 minute period over which ME #2 and Catalyst #2 was added. A catalyst/activator pair was added after the ME #2 feed was completed. The final reaction mixture was neutralized to a pH of 7.5 with 29% aqueous ammonia. Sample 2 had a Brookfield viscosity of 28 cps at a weight % solids content of 37.5% and a particle size of 71 nanometers. Comparative Sample B had a Brookfield viscosity of 113 cps at a weight % solids content of 37.8% and a particle size of 76 nanometers. Comparative Sample C had a Brookfield viscosity of 36 cps at a weight % solids content of 37.6% and a particle size of 70 nanometers. Sample 3 had a Brookfield viscosity of 26 cps at a weight % solids content of 38.1% and a particle size of 71 nanometers. Sample 4 had a Brookfield viscosity of 21 cps at a weight % solids content of 37.9% and a particle size of 76 nanometers.

TABLE 2.1.

| Monomer Emulsions for Sample 2 | |
|---|---|
| ME #1 | |
| DI water | 212.84 |
| Anionic Surfactant (23% active) | 43.68 |
| Methyl Methacrylate | 557.02 |
| Butyl Acrylate | 73.43 |
| Styrene | 55.42 |
| Methacrylic acid | 6.93 |
| ME #2 | |
| Di water | 212.84 |
| Anionic Surfactant (23% active) | 43.68 |
| Butyl Acrylate | 372.70 |
| Methyl Methacrylate | 146.90 |
| Acetylacetoxy ethyl Methacrylate | 138.60 |
| Methacrylic acid | 34.60 |

TABLE 2.2

| Monomer Emulsions for Comparative Sample B | |
|---|---|
| ME #1 | |
| DI water | 212.84 |
| Anionic Surfactant (23% active) | 43.68 |
| Methyl Methacrylate | 557.02 |
| Butyl Acrylate | 73.43 |
| Styrene | 55.42 |
| Methacrylic acid | 6.93 |
| ME #2 | |
| DI water | 212.84 |
| Anionic Surfactant (23% active) | 43.68 |
| Butyl Acrylate | 372.70 |

TABLE 2.2-continued

| Monomer Emulsions for Comparative Sample B | |
|---|---|
| Methyl Methacrylate | 146.90 |
| Hydroxyethyl Methacrylate | 138.60 |
| Methacrylic acid | 34.60 |

TABLE 2.3

| Monomer Emulsions used in Comparative Sample C | |
|---|---|
| ME #1 | |
| DI water | 212.84 |
| Anionic Surfactant (23% active) | 43.68 |
| Methyl Methacrylate | 557.02 |
| Butyl Acrylate | 73.43 |
| Styrene | 55.42 |
| Methacrylic acid | 6.93 |
| ME #2 | |
| DI water | 212.84 |
| Anionic Surfactant (23% active) | 43.68 |
| Butyl Acrylate | 372.70 |
| Methyl Methacrylate | 146.90 |
| Hydroxyethyl Methacrylate | 69.30 |
| Acetoacetoxy ethyl Methacrylate | 69.30 |
| Methacrylic acid | 34.63 |

TABLE 2.4

| Monomer Emulsions used in Sample 3 | |
|---|---|
| ME #1 | |
| DI water | 212.80 |
| Anionic Surfactant (23% active) | 43.60 |
| Methyl Methacrylate | 335.34 |
| Acrylonitrile | 138.56 |
| Butyl Acrylate | 135.80 |
| Styrene | 69.29 |
| Methacrylic Acid | 6.93 |
| Allyl Methacrylate | 6.93 |
| ME #2 | |
| DI water | 212.80 |
| Anionic Surfactant (23% active) | 43.60 |
| Butyl Acrylate | 360.29 |
| Methyl Methacrylate | 159.36 |
| Acetoacetoxy ethyl Methacrylate | 138.57 |
| Methacrylic acid | 34.64 |

TABLE 2.5

| Monomer Emulsions used in Sample 4 | |
|---|---|
| ME #1 | |
| DI water | 212.80 |
| Anionic Surfactant | 43.68 |
| Methyl Methacrylate | 491.93 |
| Butyl Acrylate | 90.07 |
| Styrene | 69.29 |
| Methacrylic acid | 34.64 |
| Allyl Methacrylate | 6.93 |
| ME #2 | |
| DI water | 212.80 |
| Anionic Surfactant | 43.68 |
| Butyl Acrylate | 415.72 |
| Acetoacetoxy ethyl Methacrylate | 138.57 |
| Acrylonitrile | 69.29 |
| Methacrylic acid | 34.64 |
| Styrene | 34.64 |

EXAMPLE 3

Preparation and Evaluation of Waterborne Coating Compositions

Preparation of Composition i and Comparative Compositions a–e. Waterborne compositions were prepared by adding the ingredients with stirring, in the order given in Table 3.1.

TABLE 3.1

Waterborne Composition i and Comparative Compositions a–e.

| Waterborne Composition | i | Comp. a | Comp. b | Comp. c | Comp. d | Comp. e |
|---|---|---|---|---|---|---|
| Sample 2 | 700 | 700 | — | — | — | — |
| Comp. Sample B | — | — | 700 | 700 | — | — |
| Comp. Sample C | — | — | — | — | 700 | 700 |
| EB | 7.9 | 7.9 | 7.9 | 7.9 | 7.9 | 7.9 |
| TEGOGLIDE 410 (50% in EB) | 1.05 | 1.05 | 1.05 | 1.05 | 1.05 | 1.05 |
| ACRYSOL RM-825 (5% solids in water) | 5.2 | 5.2 | 5.2 | 5.2 | 5.2 | 5.2 |
| BAYHYDUR XP-7063 | 13.1 | 0 | 13.1 | 0 | 13.1 | 0 |
| Water (to 24 ± 2 sec. #2 Zahn) | 0 | 0 | 60.7 | 92.8 | 25.0 | 17.9 |

Notes to TABLE 3.1:
1) EB = ethylene glycol monoethyl ether
2) TEGOGLIDE is a trademark of Tegochemie Service USA; TEGOGLIDE is a slip aid..
3) ACRYSOL is a trademark of Rohm and Haas Co.; Acrysol RM-825 is a rheology modifier.
4) BAYHYDUR is a trademark of Miles Inc.; BAYHYDUR XP-7063 is a water-dispersible polyisocyanate bearing at least two isocyanate groups.

Waterborne composition land Comparative Compositions a–e, at 2–4 hours old, were applied to maple veneer wood panels using a conventional air-spray gun. The maple panels had two coats, 1.0 mil dry film thickness each, with light sanding between coats. After 20 minutes flash-off period, panels were force-dried for 10 minutes at 140° F. after each coat, and cured for 5 days at 33° C. prior to testing. Test results are presented in Table 3.2.

TABLE 3.2

Evaluation of cured Waterborne compositions i–iii and Comparative Compositions a–c

| Waterborne Composition | i | Comp. a | Comp. b | Comp. c | Comp. d | Comp. e |
|---|---|---|---|---|---|---|
| 16 hour spot tests on maple veneer, after recovery (0–10 scale, 10 best): | | | | | | |
| 7% ammonia | 5 | 1 | 1 | 0 | 3 | 1 |
| 1% DREFT detergent solution | 8 | 6 | 6 | 5 | 6 | 5 |

The chemical and stain resistance of cured fillm of waterborne composition i of this invention is superior to that of Comparative Compositions a–e.

EXAMPLE 4

Preparation and Evaluation of Waterborne Coating Compositions

Preparation of Compositions ii–iv and Comparative Compositions f–h. Waterborne compositions were prepared by adding the ingredients with stirring, in the order given in Table 4.1.

TABLE 4.1

Waterborne Compositions ii–iv and Comparative Compositions f–h.

| Waterborne Composition | Comp. f | ii | Comp. g | iii | iv | Comp. h |
|---|---|---|---|---|---|---|
| Sample 3 | 181.63 | 181.63 | — | — | — | — |
| Sample 4 | — | — | 184.94 | 184.94 | — | — |
| Sample 1 | — | — | — | — | 200.00 | — |
| Comp. Sample A | — | — | — | — | — | 200.0 |
| DPM | 2.8 | 2.8 | 2.8 | 2.8 | — | — |
| TEGOGLIDE 410 (50% in EB) | 0.42 | 0.42 | 0.42 | 0.42 | 0.4 | 0.4 |
| ACRYSOL RM-825 (1% solids in water) | 25.2 | 23.03 | 29.03 | 22.62 | 22.0 | 18.0 |
| Water | 6.00 | 9.07 | — | 5.70 | 48.5 | 39.5 |
| BAYHYDUR XP-7063 | — | 6.00 | — | 6.00 | — | — |
| BAYHYDROL XP-7043 | — | — | — | — | 7.70 | 7.70 |

Notes to TABLE 4.1:
1) DPM = dipropylene glycol monomethyl ether
2) EB = ethylene glycol monoethyl ether
3) TEGOGLIDE is a trademark of Tegochemie Service USA; TEGOGLIDE is a slip aid..
4) ACRYSOL is a trademark of Rohm and Haas Co.; Acrysol RM-825 is a rheology modifier.
5) BAHYDUR is a trademark of Miles Inc.: BAYHYDUR XP-7063 is a water-dispersible polyisocyanate bearing at least two isocyanate groups.
6) BAYHYDROL is a trademark of Miles Inc.: BAYHYDOL XP-7043 is a water-dispersible polyisocyanate bearing at least two isocyanate groups.

Waterborne compositions ii–iv and Comparative Compositions f–h, at 1–4 hours old, were applied to maple veneer wood panels using a conventional air-spray gun. The maple panels had two coats applied, each coat was 1.0–1.2 mils dry film thickness, with light sanding in between coats. After a brief flash-off period, panels were force-dried and cured overnight at 120° F. prior to testing. Test results are presented in Table 4.2.

TABLE 4.2

Evaluation of cured Waterborne compositions ii–iv and Comparative Compositions f-h

| Waterborne Composition | Comp. f | ii | Comp. g | iii | iv | Comp. h |
|---|---|---|---|---|---|---|

16 hour spot tests

TABLE 4.2-continued

Evaluation of cured Waterborne compositions ii–iv and Comparative Compositions f–h

| Waterborne Composition | Comp. f | ii | Comp. g | iii | iv | Comp. h |
|---|---|---|---|---|---|---|
| on maple veneer, after recovery (0–10 scale, 10 best): | | | | | | |
| 7% ammonia | 1 | 5 | 2 | 2 | 5 | 7 |
| 1% DREFT detergent solution | 5 | 9 | 5 | 8 | 9 | 8 |
| 10% sodium carbonate | 8 | 8 | 3 | 9 | 8 | 7 |
| 409 household cleaner | 2 | 8 | 3 | 3 | 8 | 4 |
| 50% Ethanol | 6 | 8 | 6 | 8 | 6 | 3 |
| 1 hour spot tests on maple veneer, after recovery (0–10 scale, 10 best): | | | | | | |
| Butyl acetate | 3 | 4 | 4 | 5 | 4 | 3 |
| 70% isopropanol | 2 | 5 | 3 | 8 | 5 | 4 |

The chemical and stain resistance of cured films of waterborne composition ii of this invention is superior to that of Comparative Composition f; as is waterborne composition iii of this invention is superior to that of Comparative Composition g; and as is waterborne composition iv of this invention is superior to that of Comparative Composition h.

EXAMPLE 5

Preparation and Evaluation of Waterborne Coating Compositions

Preparation of Compositions v–vi and Comparative Compositions j–l. Waterborne compositions were prepared by adding the ingredients with stirring, in the order given in Table 5.1. Comparative Sample D was an acrylic latex polymer free from hydroxyl, amino, or active methylene groups.

TABLE 5.1

Waterborne Compositions v–vi and Comparative Compositions j–l.

| Waterborne composition | Comp. j | Comp. k | Comp. l | v | vi |
|---|---|---|---|---|---|
| Comp. Sample D | 180.0 | — | 159.7 | — | — |
| Sample 2 | — | 180.0 | — | 162.6 | 162.6 |
| EB | — | — | 2.5 | — | — |
| EB:DEB 3:1 premix | 6.9 | 6.9 | — | — | — |
| TEGOGLIDE 410 (50% in EB) | 0.4 | 0.4 | 0.4 | 0.5 | 0.4 |
| ACRYSOL RM-825 (5% solids in water) | 2.7 | 2.9 | 1.9 | 2.4 | 1.4 |
| Water | 25.2 | 34 | 26.6 | 33.2 | 23.9 |
| BYK 346 | 0.2 | 0.3 | 0.2 | 0.4 | 0.4 |
| DESMODUR VP LS 2032 (Bayer) | — | — | 11.2 | 11.2 | — |
| BASONAT P LR 8878 (BASF) | — | — | — | — | 11.2 |

Notes to TABLE 5.1:
1) DEB = diethylene glycol monobutyl ether
2) EB = ethylene glycol monoethyl ether
3) TEGOGLIDE is a trademark of Tegochemie Service USA; TEGOGLIDE is a slip aid.
4) ACRYSOL is a trademark of Rohm and Haas Co.; Acrysol RM-825 is a rheology modifier.
5) BYK 346 is a trademark of Byk-Mallinkrodt Co.
6) DESMODUR is a trademark of BAYER AG: DESMODUR VP LS 2032 is a water-dispersible polyisocyanate bearing at least two isocyanate groups.
5) BASONAT is a trademark of BASF AG: BASONAT P LR 8878 is a water-dispersible polyisocyanate bearing at least two isocyanate groups.

Waterborne Compositions v–vi and Comparative Compositions j–l, at 2–4 hours old, were applied to maple veneer, NORYL 844 (NORYL is a trademark of General Electric Corp.; polyphenylene oxide/polystyrene plastic), and primed polypropylene panels using a compressed air spray gun. Plastic panels had one coat at 1.0 mils dry film thickness/coat. Maple panels had two coats, 1.0 mils film thickness, with light sanding in between coats. Panels were dried under ambient conditions and aged for one week prior to testing. Test results are presented in Table 5.2.

TABLE 5.2

Evaluation of cured Waterborne compositions v–vi and Comparative Compositions j–l

| Waterborne composition | Comp. j | Comp. k | Comp. l | v | vi |
|---|---|---|---|---|---|
| 16 hour spot tests on maple veneer, after recovery (0–10 scale, 10 best): | | | | | |
| 7% ammonia | 2 | 1 | 4 | 7 | 6 |
| 409 household cleaner | 1 | 1 | 2 | 10 | 9 |
| 1% DREFT detergent solution | 5 | 3 | 9 | 9 | 9 |
| 50% Ethanol | 5 | 6 | 9 | 10 | 9 |
| 1 hour spot tests on maple veneer, after recovery (0–10 scale, 10 best): | | | | | |
| Butyl acetate | 1 | 3 | 4 | 8 | 8 |
| 70% isopropanol | 6 | 3 | 6 | 6 | 6 |
| MEK double rubs on NORYL 844 | 5 (dissolved) | 6 (dissolved) | 12 (dissolved/cracks) | 25 (cracks) | 20 (cracks) |

Notes to TABLE 5.2:
1) DREFT is a trademark of Procter and Gamble Co.
2) NORYL is a trademark of General Electric Corp.

The chemical and stain resistance of cured films of waterborne compositions v–vi of this invention are superior to that of Comparative Compositions j–l.

EXAMPLE 6

Preparation and Evaluation of Waterborne Maintenance Coating Compositions

Preparation of maintanance coating Composition vii and Comparative Compositions m–o. Waterborne compositions were prepared with the ingredients given in Table 6.1. Water 1, TAMOL 681M, Ammonia, TRITON CF-10, and TIONA RCL-628 were dispersed using a high speed Cowles dissolver. The the other ingredients were added with stirring, in the order given.

TABLE 6.1

Waterborne Composition vii and Comparative Compositions m–o.

| Waterborne composition | Comp. m | Comp. n | Comp. o | vii |
|---|---|---|---|---|
| Comp. Sample A | — | 182.0 | 163.3 | — |
| Sample 1 | 181.01 | — | — | 162.24 |
| water 1 | 11.24 | 11.24 | 11.24 | 11.24 |
| TAMOL 681M | 1.64 | 1.64 | 1.64 | 1.64 |
| Ammonia (28%) | 0.14 | 0.14 | 0.14 | 0.14 |
| TRITON CF-10 | 0.19 | 0.19 | 0.19 | 0.19 |
| TIONA RCL-628 | 39.79 | 39.79 | 39.79 | 39.79 |
| water 2 | 9.44 | 7.73 | 19.38 | 21.02 |
| ACRYSOL RM-825 | 0.88 | 0.92 | 0.90 | 0.75 |
| BAYHYDROL XP-7043 (Miles) | — | — | 6.90 | 6.84 |

Notes to TABLE 6.1:
1) TAMOL is a trademark of Rohm and Haas Co.; Tamol 681 M is an anionic pigment dispersant
2) TRITON is a trademark of Union Carbide Co.; TRITON CF-10 is a anionic surfactant
3) TIONA is a trademark of SCM Chemicals; TIONA RCL-628 is titanium dioxide
4) ACRYSOL is a trademark of Rohm and Haas Co.; Acrysol RM-825 is a rheology modifier.
5) BAHYDROL is a trademark of Miles Co.: BAYHYDROL XP-7043 is a water-dispersible polyisocyanate bearing at least two isocyanate groups.

Treated Aluminium panels were coated with an epoxy primer (Sherwin-Williams Co. Tile-Clad II) using a 10 mil drawdown blade which gave a 2 mil dry film thickness. The samples were dried for one day before the topcoat was applied. Topcoat waterborne composition vii and Comparative Compositions m–o were drawn down using a 10 mil blade which gave a 2 mil dry film thickness; the coatings were cured for 5 days at ambient conditions before testing. The spot tests were carried out by placing a 1 inch by 1 inch square cheesecloth on the coating and saturating the cheesecloth with the test liquid. Test results are presented in Table 6.2.

TABLE 6.2

Evaluation of cured Waterborne compositions vii and Comparative Compositions m–o

| Waterborne composition | Comp. m | Comp. n | Comp. o | vii |
|---|---|---|---|---|
| spot tests (1–5 scale, 5 best): | | | | |
| 3.7% HCl; 30 min. saturation | 5 | 5 | 5 | 5 |
| 2% NaOH; 30 min. saturation | 5 | 4 | 4 | 4 |
| xylene; 6 hrs. saturation | 1 | 1 | 1 | 5 |
| butyl acetate; 6 hrs. saturation | 1 | 1 | 1 | 5 |
| MEK, 6 hrs. saturation | 1 | 1 | 1 | 5 |
| MEK double rubs | 59 | 53 | 83 | >600 |

Note to TABLE 6.2:
1) MEK is methyl ethyl ketone

The chemical resistance of the cured maintenance coating film of waterborne composition vii of this invention is superior to those of Comparative Compositions m–o.

What is claimed is:

1. A waterborne coating composition comprising an aqueous dispersion of a polymer, said polymer being substantially free from hydroxyl, primary amino, and secondary amino groups and said polymer bearing at least two active methylene groups; and an aqueous dispersion of a polyisocyanate bearing at least two isocyanate groups.

2. The composition of claim 1 wherein said active methylene groups are selected from the group consisting of acetoacetates, acetoacetamides, cyanoacetates, and cyanoamides.

3. The composition of claim 1 wherein said active methylene groups are acetoacetates.

4. The composition of claim 1 wherein said polymer is an addition polymer formed by an emulsion polymerization of at least two ethylenically unsaturated monomers, said monomers comprising from about 5% to about 25% by weight, based on the weight of said addition polymer, acetoacetoxyethyl methacrylate.

5. The composition of claim 4 wherein said addition polymer has a glass transition temperature from about −30° C. to about 45° C.

6. The composition of claim 1 wherein said polyisocyanate comprises isocyanate groups selected from the group consisting of aliphatically bound isocyanate groups, cycloaliphatically bound isocyanate groups, and mixtures thereof.

7. The composition of claim 1 wherein said polyisocyanate comprises isocyanurate groups, said polyisocyanate having been formed from 1,6-hexamethylene diisocyanate.

* * * * *